(12) United States Patent  (10) Patent No.: US 8,064,970 B2
Gaddy et al.  (45) Date of Patent: Nov. 22, 2011

(54) HINGE ASSEMBLIES FOR MOBILE TERMINALS

(75) Inventors: David W. Gaddy, Raleigh, NC (US); Veli Matti Maata, Apex, NC (US); Sang Beom Kim, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 588 days.

(21) Appl. No.: 12/210,426

(22) Filed: Sep. 15, 2008

(65) Prior Publication Data

US 2010/0041448 A1   Feb. 18, 2010

Related U.S. Application Data

(60) Provisional application No. 61/089,109, filed on Aug. 15, 2008.

(51) Int. Cl.
 *H04M 1/00* (2006.01)
(52) U.S. Cl. ............... 455/575.1; 455/575.3; 455/575.8; 379/419
(58) Field of Classification Search ............... 455/575.1, 455/575.3, 575.8; 379/419
See application file for complete search history.

(56) References Cited

U.S. PATENT DOCUMENTS

| 2,040,279 A * | 5/1936 | Soss ............................... 16/273 |
| 2006/0105824 A1 | 5/2006 | Kim et al. |
| 2008/0176610 A1 * | 7/2008 | Pan et al. .................. 455/575.3 |

FOREIGN PATENT DOCUMENTS

DE   10 2005 053 285   5/2007

OTHER PUBLICATIONS

The International Search Report and The Written Opinion for PCT/US2009/001019, mailed May 7, 2009.

* cited by examiner

*Primary Examiner* — Tuan H Nguyen
(74) *Attorney, Agent, or Firm* — Myers Bigel Sibley & Sajovec

(57) ABSTRACT

A hinge assembly includes a first frame member having two spaced-apart portions with a first pair of opposing cam slots defining a first cam path. A second frame member has two spaced-apart portions with a second pair of opposing cam slots defining a second cam path and a second cam pin in the second pair of opposing cam slots. A first cam pin is in the first pair of opposing cam slots and moves along the pin cam path. A second cam pin is in the second pair of opposing cam slots and moves along the second cam path. The frame members are configured to move between a closed position and an open position as the first and second cam pins move in the respective first and second cam paths when the first and second frame members are rotated between the closed position and the open position.

17 Claims, 9 Drawing Sheets

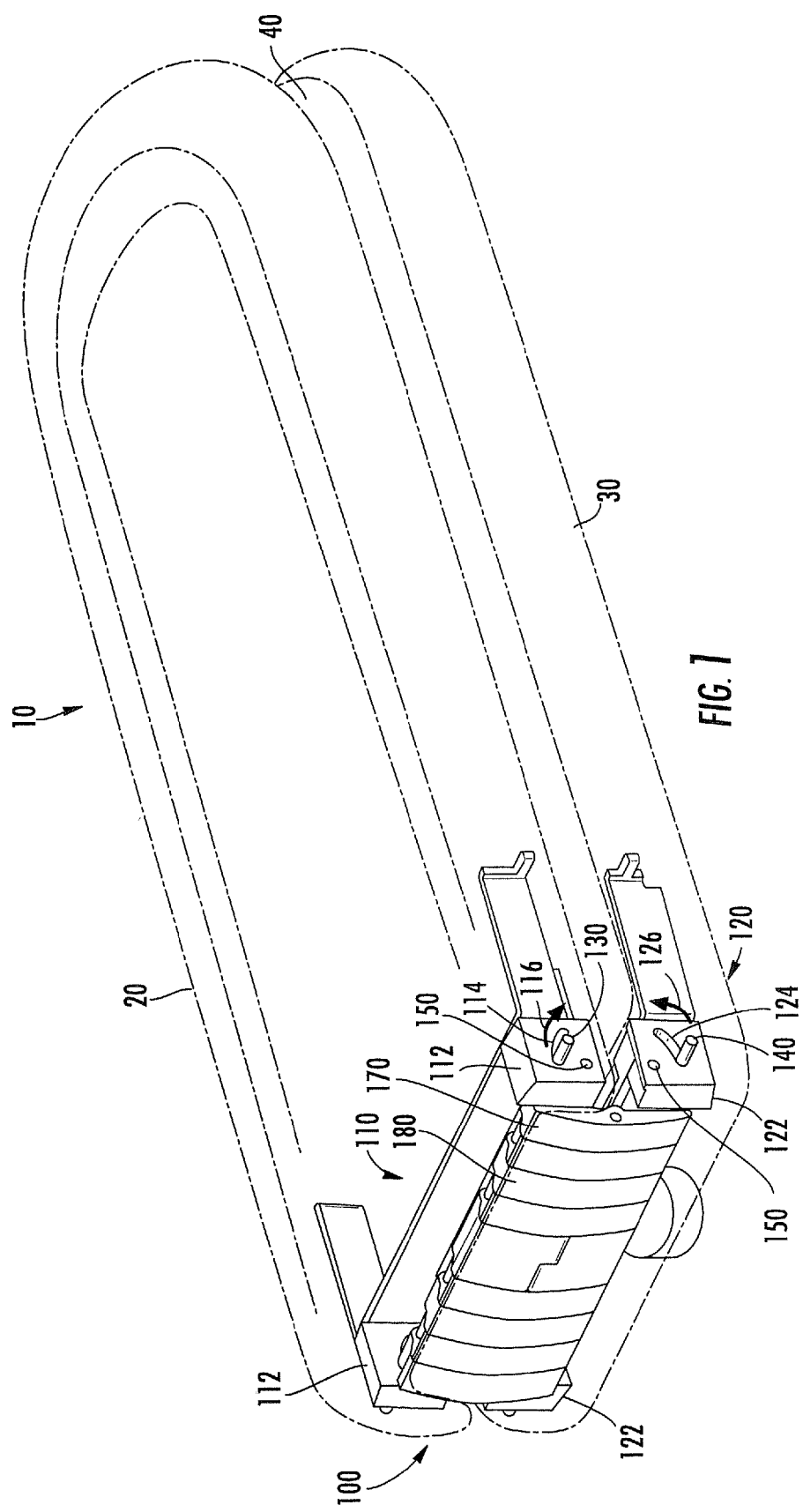

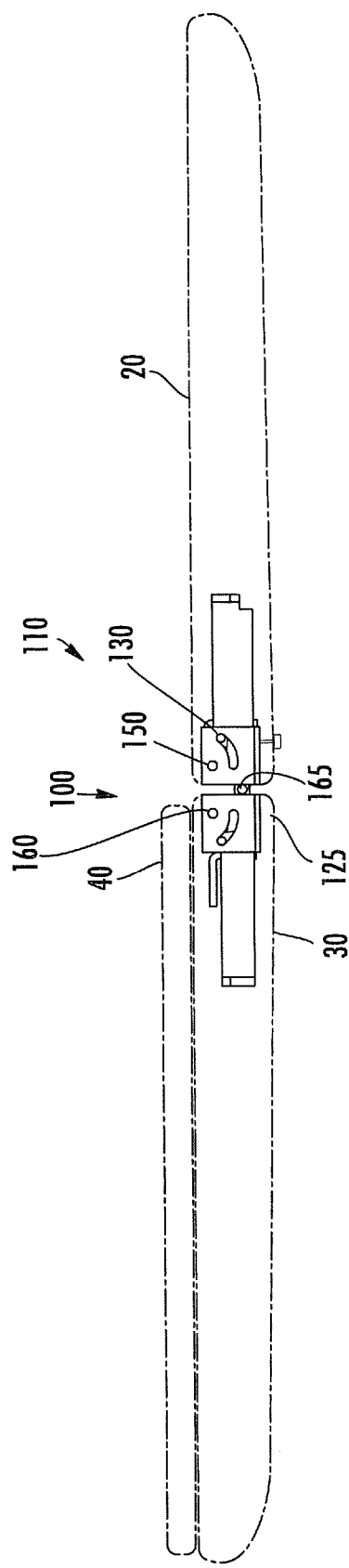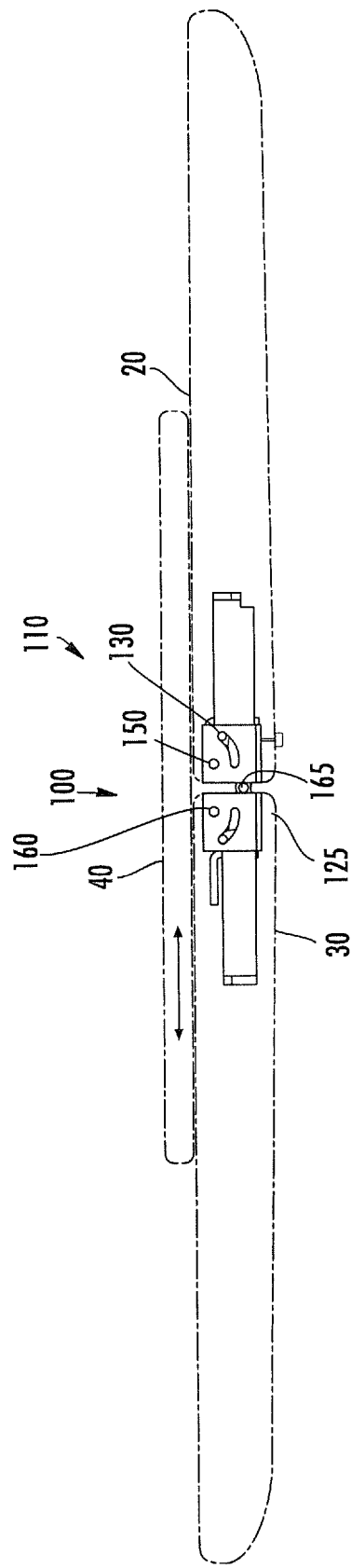
FIG. 2A
FIG. 2B

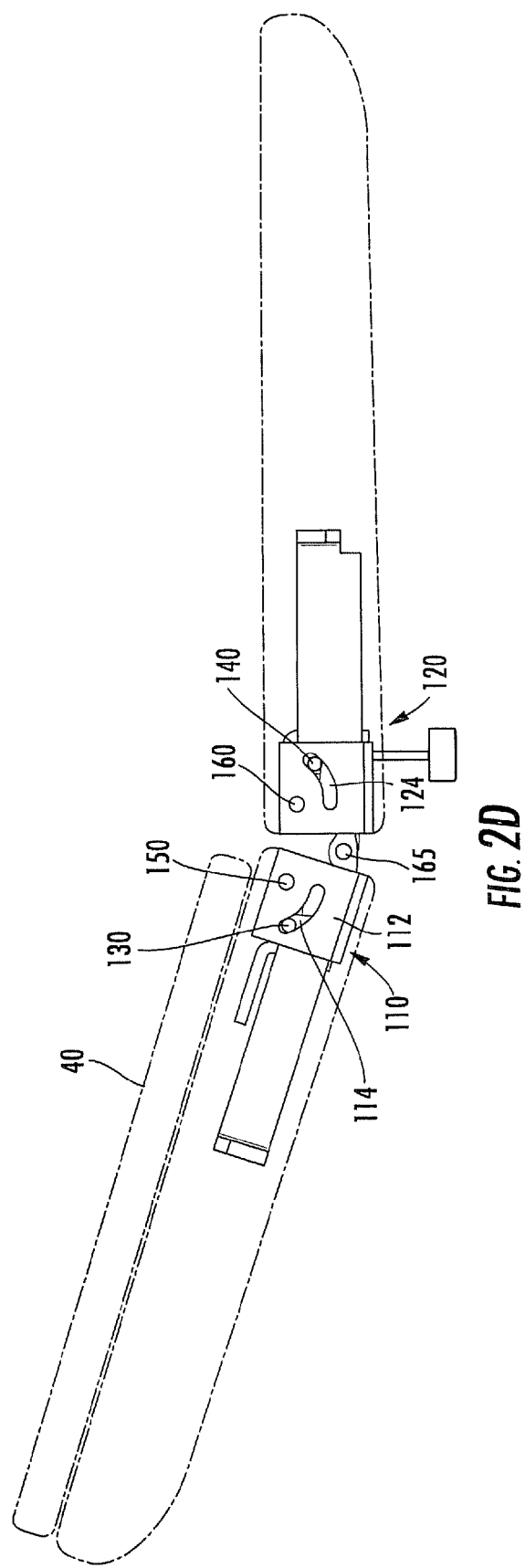

US 8,064,970 B2

HINGE ASSEMBLIES FOR MOBILE TERMINALS

CROSS-REFERENCE TO RELATED PATENT APPLICATIONS

This application claims priority from U.S. Provisional Application Ser. No. 61/089,109 filed Aug. 15, 2008, the disclosure of which is hereby incorporated by reference herein in its entirety.

FIELD OF THE INVENTION

The present invention relates to a hinge assembly for a mobile terminal.

BACKGROUND

Conventional hinges for mobile terminals, such as mobile communications devices, generally include a pin that connects two housing portions and are commonly referred to as "flip" phones. The housing portions rotate about the hinge pin to "flip" from a closed position to an open position. The hinge pin typically protrudes above the profile of the phone housing when the housing portions are in the open position. These "flip" phones may be compact when in the closed position for ease of storage, and also provide additional surface area for key pads, displays, etc. when the phone is in use in the open position.

Other phone configurations include "slider" mobile telephones in which two housing portions of the phone are slidably connected to one another. When not in use, the two housing portions can overlap one another to maintain the compactness of the phone. The housing portions can slide apart so that one housing portion extends away from the other to provide additional surface area when the phone is in use.

SUMMARY OF EMBODIMENTS OF THE INVENTION

In some embodiments, a hinge assembly for a mobile communications device includes a first frame member having two spaced-apart portions with a first pair of opposing cam slots defining a first cam path. A second frame member has two spaced-apart portions with a second pair of opposing cam slots defining a second cam path and a second cam pin in the second pair of opposing cam slots. A first cam pin is in the first pair of opposing cam slots and is configured to move along the pin cam path. A second cam pin is in the second pair of opposing cam slots and configured to move along the second cam path. A third pin extends between the two spaced-apart portions of the first frame member. A fourth pin extends between the two spaced-apart portions of the second frame member. At least first and second links are provided such that the first link has a first end rotatably connected to the first cam pin and an opposite second end rotatably connected to the fourth pin. The second link has a first end rotatably connected to the second cam pin and an opposite second end rotatably connected to the third pin. The first and second frame members are configured to move between a closed position and an open position as the first and second cam pins move in the respective first and second cam paths when the first and second frame members are rotated between the closed position and the open position.

In some embodiments, the first and second frame members define an opening therebetween when the first and second frame members are in the closed position. The opening between the first and second frame members can be configured to receive a display. The first and second frame members can be configured to extend in generally opposing directions when in the open position to define a substantially flat surface extending between the first and second frame members. The first and second frame members include a sliding track configured so that the display is slidable across the substantially flat surface extending between the first and second frame members.

In some embodiments, the first and second pairs of opposing cam slots are curvilinear.

In some embodiments, a stopper defines a partially opened position of the first and second frame members between the closed position and the open position. The stopper can be configured to abut the one or more links to prevent movement from the partially opened position to the open position. The stopper can be moveable between an active position, in which the stopper is configured to abut the one or more links to prevent movement of the first and second frame members from the partially opened position to the open position, and an inactive position, in which the stopper is configured to allow movement of the one or more links between the closed position, the partially opened position and the open position.

In some embodiments, a mobile terminal includes first and second housing portions, and a hinge assembly rotatably connecting the first and second housing portions. The hinge assembly includes a first frame member connected to the first housing portion and having two spaced-apart portions with a first pair of opposing cam slots defining a first cam path. A second frame member has two spaced-apart portions with a second pair of opposing cam slots defining a second cam path and a second cam pin in the second pair of opposing cam slots. A first cam pin is in the first pair of opposing cam slots and is configured to move along the pin cam path. A second cam pin is in the second pair of opposing cam slots and configured to move along the second cam path. A third pin extends between the two spaced-apart portions of the first frame member. A fourth pin extends between the two spaced-apart portions of the second frame member. At least first and second links are provided such that the first link has a first end rotatably connected to the first cam pin and an opposite second end rotatably connected to the fourth pin. The second link has a first end rotatably connected to the second cam pin and an opposite second end rotatably connected to the third pin. The first and second frame members are configured to move between a closed position and an open position as the first and second cam pins move in the respective first and second cam paths when the first and second frame members are rotated between the closed position and the open position.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a perspective view of a mobile terminal in a closed position and having a hinge assembly according to embodiments of the present invention.

FIGS. 2A and 2B are side views of the mobile terminal of FIG. 1 with a slidably display in an open configuration.

FIG. 2D is a side view of the mobile terminal of FIG. 1 in a partially opened "flip phone" configuration according to some embodiments of the present invention.

DETAILED DESCRIPTION OF EMBODIMENTS OF THE INVENTION

Figure 2C:
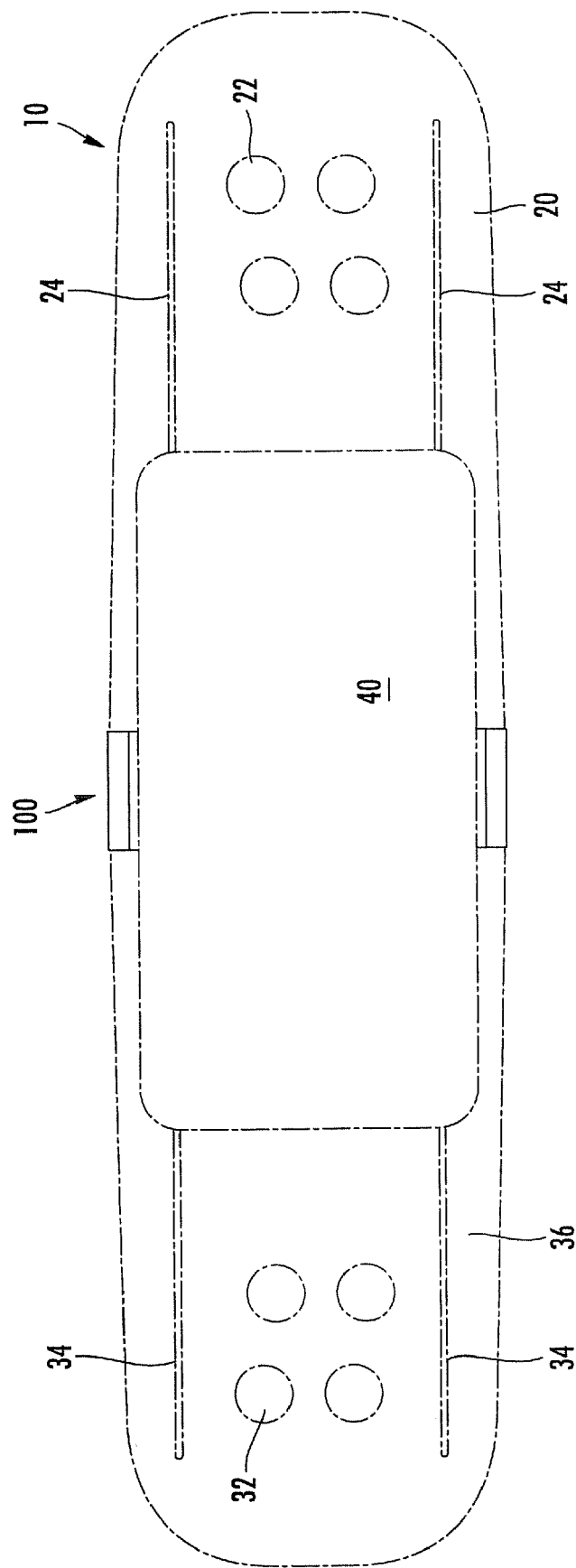
FIG. 2C is a top view of the mobile terminal of FIG. 1 in an open configuration with a slidable display according to some embodiments of the current invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

As used herein, a "mobile terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

As used herein, a "display" includes, but is not limited to, a device capable of providing a visual representation, such as graphics, lighting or back-lighting for displaying information and/or for aesthetic purposes.

As illustrated in FIG. 1, a mobile terminal device 10 according to embodiments of the present invention includes two housing portions 20, 30, a slidable display 40, and a hinge assembly 100. The hinge assembly 100 rotatably connects the two housing portions 20, 30.

With reference to FIGS. 1, 2A-2D, 3-4, 5A-5C, 6, 7A-7B and FIG. 8, the hinge assembly 100 includes a frame member 110 having two spaced-apart portions 112 with a pair of opposing cam slots 114, which defines a cam path 116. The hinge assembly 100 also includes a second frame member 120 having two spaced-apart portions 122 with another pair of opposing cam slots 124, which defines a cam path 126. Two cam pins 130, 140 are positioned in the respective opposing cam slots 114, 124 and are configured to move along the corresponding cam paths 116, 126. A third pin 150 extends between the two spaced-apart portions 112 of the frame member 110, and a fourth pin 160 extends between the two spaced-apart portions 122 of the frame member 120. The hinge assembly 100 also includes two or more links 170, 180. As can be seen in FIG. 6, the link 170 is rotatably connected to the cam pin 130 at one end thereof and is rotatably connected to the pin 160 at another end thereof. The link 180 is rotatably connected to the cam pin 140 at one end and is rotatably connected to the pin 150 at an opposite end thereof. Another pin 165 is rotatably connected to the links 170, 180. In some embodiments, a stabilizing link 155 connects the pins 130, 140 and/or provides clearance for electrical connections between the electrical components of the housing portions 20, 30 and/or the display 40.

Figure 4:
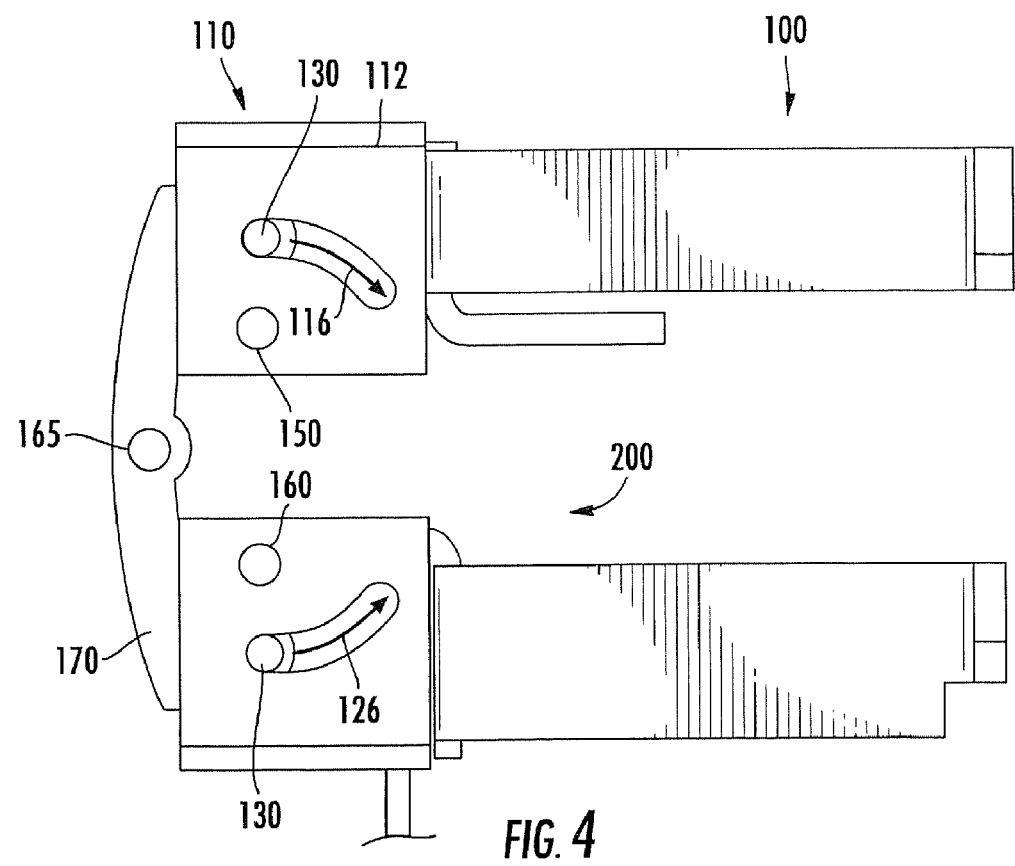
FIG. 4 is a side view of the hinge assembly of FIG. 3 in a closed configuration.
Figure 5A:
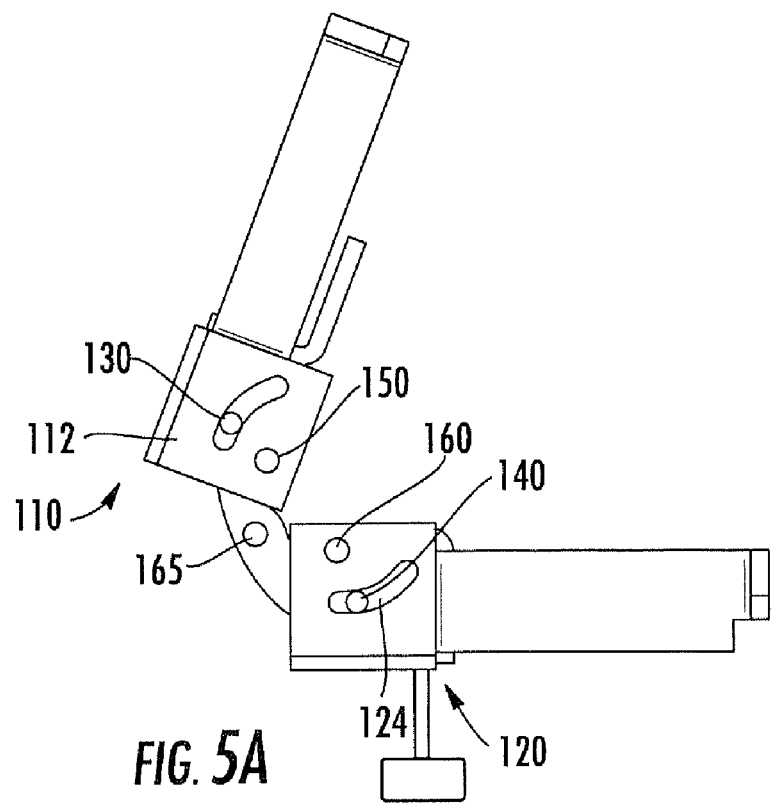
FIGS. 5A and 5B are side views of the hinge assembly of FIG. 3 in various partially opened configurations.
Figure 5B:
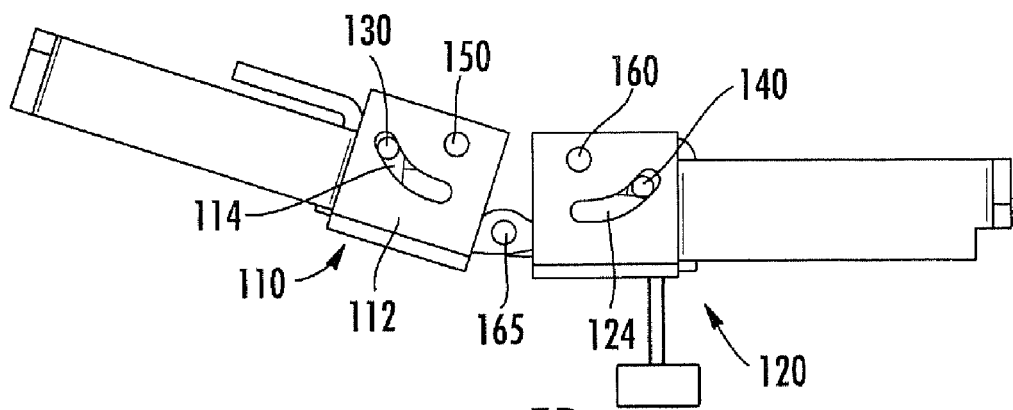
Figure 6:
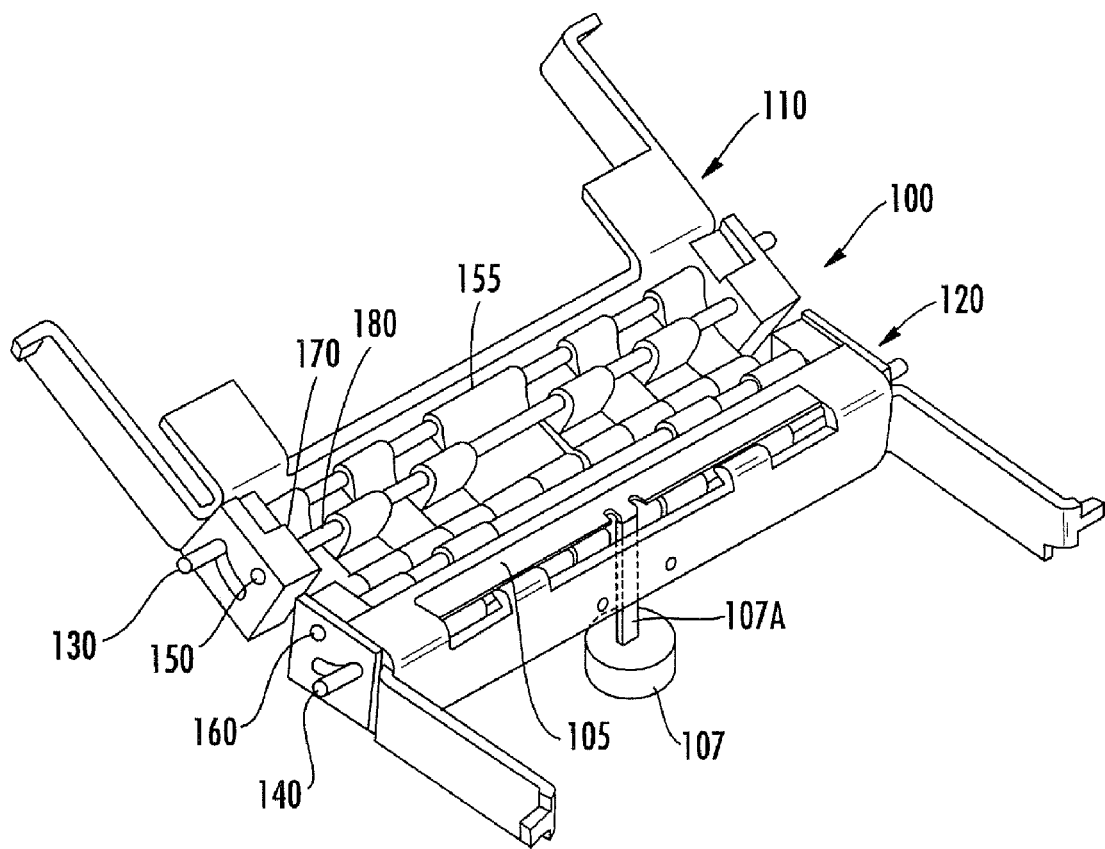
FIG. 6 is a perspective view of the hinge assembly of FIG. 3 in which the hinge assembly is locked in a partially opened configuration.

As illustrated, the two frame members 110, 120 together with the corresponding housing portions 20, 30 are configured to move between a closed position (e.g., as shown in FIG. 1) and an open position (e.g., as shown in FIG. 2A) as the cam pins 130, 140 move in the respective cam paths 116, 126 when the frame members 110, 120 are rotated between the closed and the open position as is further illustrated in FIGS. 5A-5B. In some embodiments, the frame members 110, 120 of the hinge assembly 100 define an opening 200 therebetween when the frame members 110, 120 are in the closed position (see FIGS. 3-4).

As shown in FIG. 1, the slidable display 40 is positioned between the housing portions 20, 30 when the frame members 110, 120 are in the closed position. When the housing portions 20, 30 and hinge assembly 100 are rotated to the open position such that the housing portions 20, 30 extend in opposite direction from one another, the housing portions 20, 30 form a substantially flat surface 250 as shown in FIGS. 2A-2B without a protruding hinge. In some embodiments and as further illustrated in FIGS. 2A-2B, the display 40 is configured to move laterally with a sliding motion across the housing portions 20, 30 and over the hinge assembly 100. As shown in FIG. 2C, the housing portions 20, 30 can include control buttons 22, 32 and tracks 24, 34, respectively. The display 40 can be slidably attached to the housing portions 20, 30 via the sliding tracks 24, 34 such that the display 40 can be positioned over the hinge assembly 100 and between the housing portions 20, 30 to expose the control buttons 22, 32.

Although embodiments according to the present invention are suitable for various terminal functionalities, the configuration illustrated in FIG. 2C may be particularly suitable for hand-held computer gaming functions. In some embodiments as shown in FIG. 2D, the hinge assembly 100 is configured to stop in a partially opened position, such as at about 170°, when the display 40 is positioned on the housing portion 30 and a keypad (not shown) is exposed on the surface of the housing portion 20. The configuration illustrated in FIG. 2D may be suitable for use as a "flip phone" configuration, e.g., for mobile communications operation, including cell phone use and other personal data assistant (PDA) functions.

Figure 3:
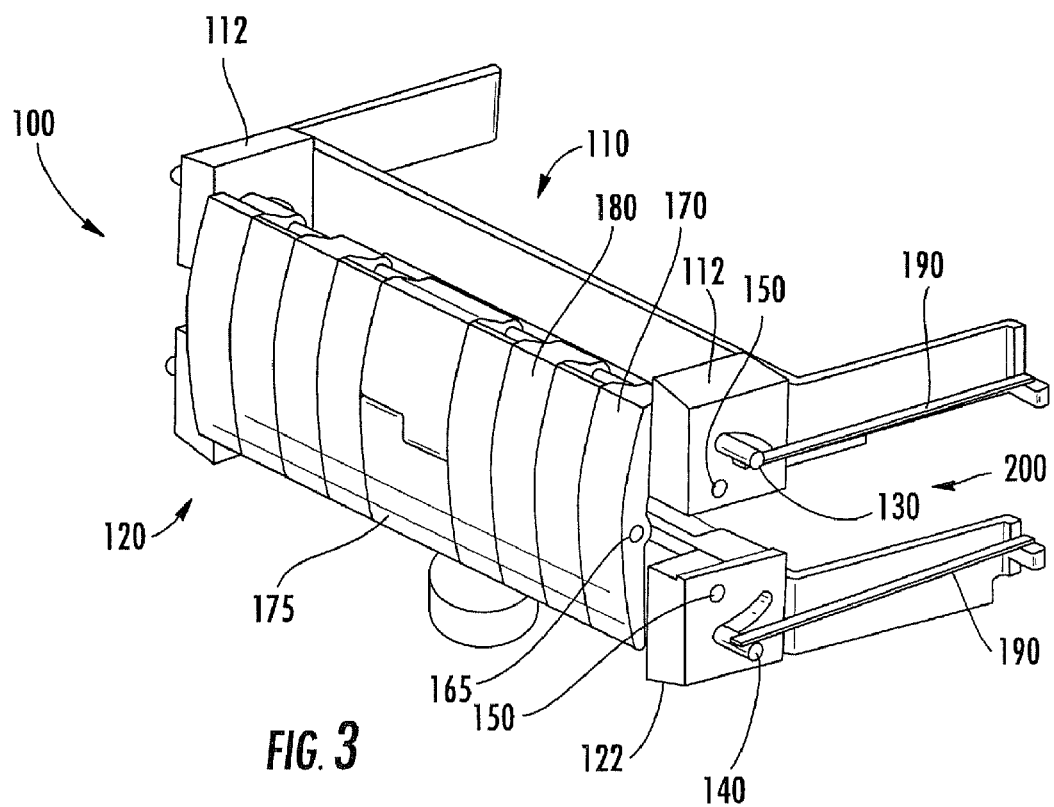
FIG. 3 is an enlarged perspective view of the hinge assembly of the mobile terminal of FIG. 1 in a closed configuration.

As shown in FIGS. 3-4, the hinge assembly 100 includes a biasing member 190 that exerts a force in a direction away from the links 170, 180 to bias the hinge assembly 100 toward the open position. In some embodiments, a mechanical or magnetic latch (not shown) can be used to oppose the biasing force and maintain the mobile terminal device 10 in the closed position (FIG. 1).

Figure 7A:
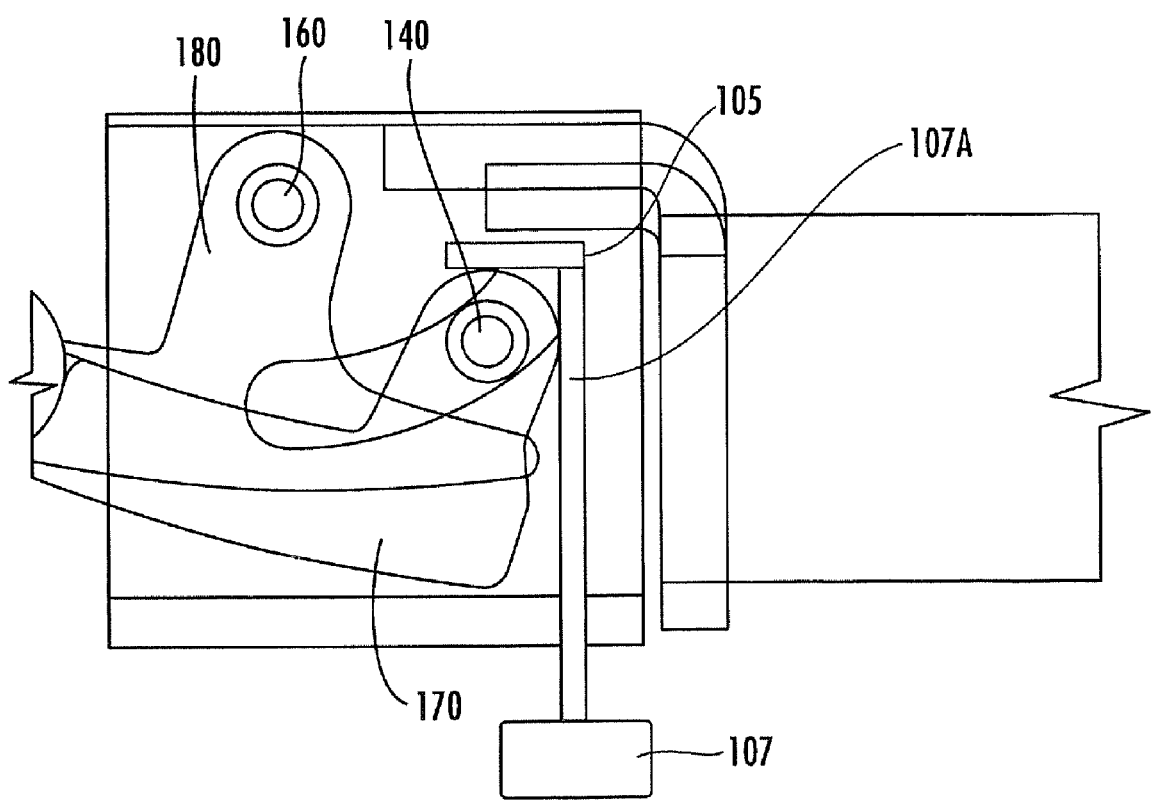
FIG. 7A is partial cut-away side view of a lock bar abutting the links of the hinge assembly of FIG. 3 to maintain the hinge assembly in the locked position according to embodiments of the present invention.
Figure 7B:
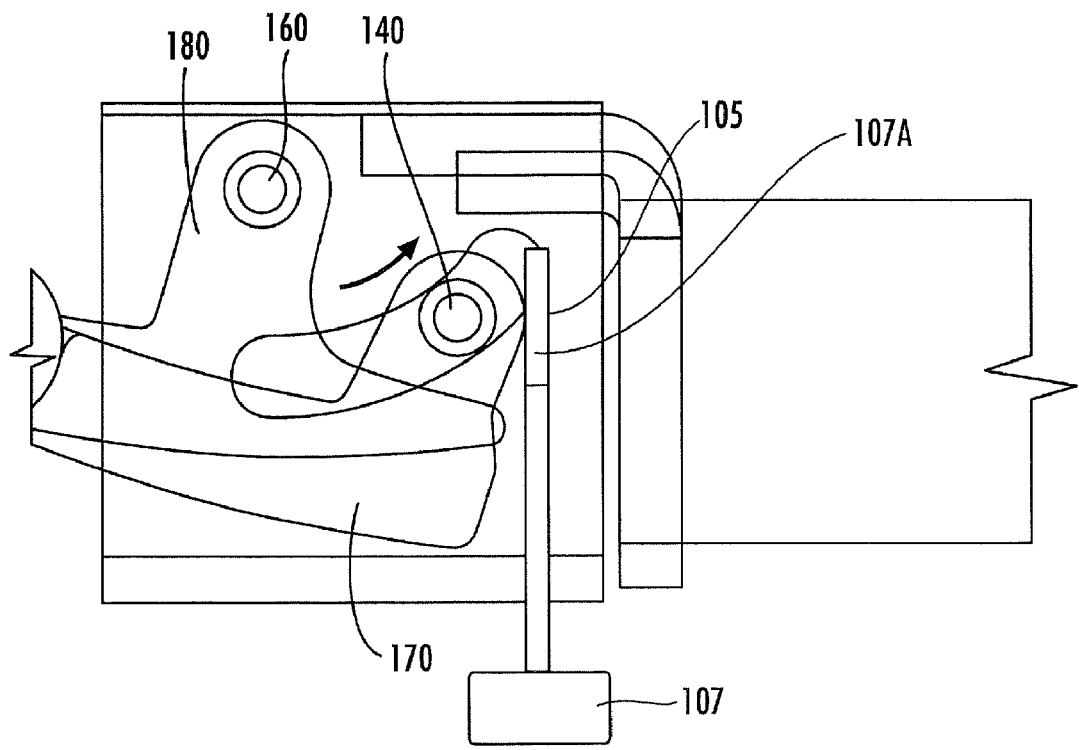
FIG. 7B is a partial cut-away side view of the lock bar of FIG. 7B in which the lock bar is released from the links to permit movement of the hinge assembly to the fully opened position according to embodiments of the present invention.
Figure 8:
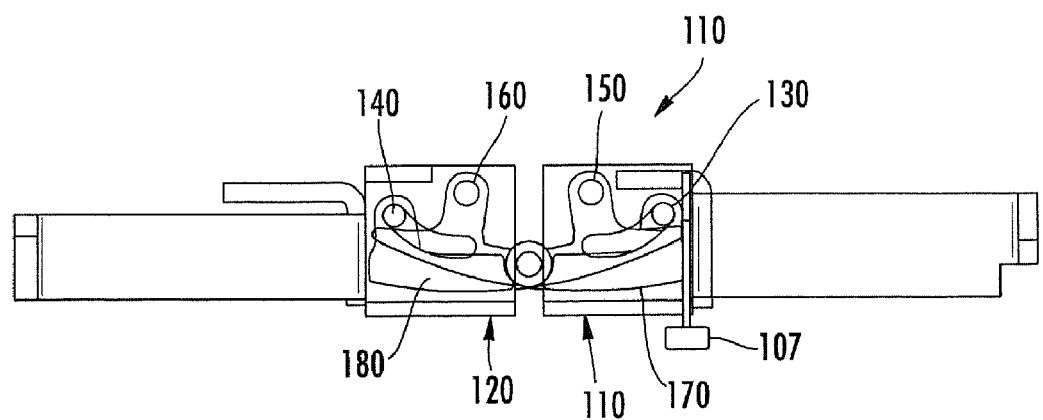
FIG. 8 is a side view of the hinge assembly of FIG. 3 in the open configuration.

As further illustrated in FIGS. 5A-5B and FIG. 6, the hinge assembly 100 includes a lock bar 105 (FIG. 6) connected to an actuator 107 by a connection member 107A. As shown in FIG. 6 and in FIG. 7A, when the actuator 107 is in the depressed position, the lock bar 105 extends substantially perpendicular to the connection member 107 and abuts at least one of the links 170 to generally prevent movement of the links 170, 180 and maintain or lock the hinge assembly 100 in a partially opened position. When the actuator 107 is moved downward as shown in FIG. 7B, then the lock bar 105 is moved away from the links 170, 180 to a position substantially parallel to the connection member 107A. In this configuration, the lock bar 105 releases the links 170, 180 to allow an increased range of motion such that the links 170, 180 and frame members 120, 130 freely move to the open position as shown in FIG. 8.

In this configuration, the lock bar 105 and lock bar actuator 107 allow a user to position the mobile terminal 10 in a "flip phone" configuration (in which lock bar 105 locks the links 170, 180 and frame members 120, 130 in the partially opened position (FIG. 2d and FIG. 6) as the user moves the phone housing portions 20, 30 from the closed to the partially opened position), and a 180° configuration (in which the lock bar 105 releases the links 170, 180 for 180° rotation (FIG. 2C and FIG. 8)). In some embodiments, the mobile communications device 10 can have different modes of operation associated with the "flip phone" configuration (i.e., when the lock bar 105 is activated to lock the links 170, 180) and in the 180 degree configuration (i.e., when the lock bar 105 is inactivated to release the links 170, 180). In particular embodiments, the mode of operation can be automatically changed based on the position of the lock bar 105 and the actuator 107. For example, the lock bar 105 and/or the actuator 107 can activate a switch to automatically change the mode of operation of the mobile communications device 10, e.g., from a cell phone/PDA mode when the lock bar 105 is activated and locks the links 170, 180 to a gaming mode when the lock bar 105 is inactivated and permits 180° rotation.

As illustrated in FIGS. 1, 2A-2D, 3-4, 5A-5C, 6, 7A-7B and FIG. 8, the hinge assembly 100 is configured to maintain sufficient space between the housing portions 20, 30 for the display 40. A substantially flat surface on the surface of the housing portions 20, 30 in the open position can also be provided for facilitating movement of the display 40 without protruding portions of a hinge or hinge pin. The curvilinear shape of the cam paths 116, 126 in cooperation with the configuration of the links 170, 180 and pins 130, 140, 150, 160 can permit ease of motion as well as maintain a relatively close fit between the housing portions 20, 30 when the housing portions are moved from the closed to the open position.

Although embodiments of the present invention are illustrated with respect to the lock bar 105 and lock bar actuator 107, it should be understood that any suitable locking mechanism can be used. For example, a locking mechanism can be used to selectively control or stop movement of the pins 130, 140 in the cam paths 116, 126 to thereby lock movement of the hinge assembly 100 in a partially open position.

It should be understood that various electrical connections, including flexible printed circuit board connectors, can extend through the hinge assembly 100, for example, via the links 170, 180 to electrically and/or communicatively connect various electrical components of the mobile terminal 10.

Although embodiments of the present invention are illustrated with respect to a slidable display 40, it should be understood that any suitable element can be used, such as a keypad or other components of a mobile communications device.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A hinge assembly for a mobile communications device, the hinge assembly comprising:
    a first frame member having two spaced-apart portions with a first pair of opposing cam slots defining a first cam path;
    a second frame member having two spaced-apart portions with a second pair of opposing cam slots defining a second cam path;
    a first cam pin in the first pair of opposing cam slots, the first cam pin being configured to move along the first cam path;
    a second cam pin in the second pair of opposing cam slots, the second cam pin being configured to move along the second cam path;
    a third pin extending between the two spaced-apart portions of the first frame member;
    a fourth pin extending between the two spaced-apart portions of the second frame member; and
    at least first and second links, the first link having a first end rotatably connected to the first cam pin and an opposite second end rotatably connected to the fourth pin, and the second link having a first end rotatably connected to the second cam pin and an opposite second end rotatably connected to the third pin;
    wherein the first and second frame members are configured to move between a closed position and an open position as the first and second cam pins move in the respective first and second cam paths when the first and second frame members are rotated between the closed position and the open position,
    wherein the hinge assembly further comprises a stopper that defines a partially opened position of the first and second frame members between the closed position and the open position.

2. The hinge assembly of claim 1, wherein the first and second frame members define a gap therebetween when the first and second frame members are in the closed position.

3. The hinge assembly of claim 2, wherein the opening gap between the first and second frame members is configured to receive a display.

4. The hinge assembly of claim 1, wherein the first and second pairs of opposing cam slots are curvilinear.

5. The hinge assembly of claim 1, wherein the stopper is configured to abut one or more of the first and second links to prevent movement from the partially opened position to the open position.

6. The hinge assembly of claim 1, wherein the stopper is moveable between an active position, in which the stopper is configured to abut one or more of the first and second links to prevent movement of the first and second frame members from the partially opened position to the open position, and an inactive position, in which the stopper is configured to allow movement of the first and second links between the closed position, the partially opened position and the open position.

7. A hinge assembly for a mobile communications device, the hinge assembly comprising:
    a first frame member having two spaced-apart portions with a first pair of opposing cam slots defining a first cam path;
    a second frame member having two spaced-apart portions with a second pair of opposing cam slots defining a second cam path;
    a first cam pin in the first pair of opposing cam slots, the first cam pin being configured to move along the first cam path;
    a second cam pin in the second pair of opposing cam slots, the second cam pin being configured to move along the second cam path;
    a third pin extending between the two spaced-apart portions of the first frame member;
    a fourth pin extending between the two spaced-apart portions of the second frame member; and
    at least first and second links, the first link having a first end rotatably connected to the first cam pin and an opposite second end rotatably connected to the fourth pin, and the second link having a first end rotatably connected to the second cam pin and an opposite second end rotatably connected to the third pin;
    wherein the first and second frame members are configured to move between a closed position and an open position as the first and second cam pins move in the respective first and second cam paths when the first and second frame members are rotated between the closed position and the open position,
    wherein the first and second frame members define a gap therebetween when the first and second frame members are in the closed position, the gap between the first and second frame members is configured to receive a display and the first and second frame members are configured to extend in generally opposing directions when in the open position to define a substantially flat surface extending between the first and second frame members.

8. The hinge assembly of claim 7, wherein the first and second frame members include a sliding track configured so that the display is slidable across the substantially flat surface extending between the first and second frame members.

9. A mobile terminal comprising:
    first and second housing portions;
    a hinge assembly rotatably connecting the first and second housing portions, the hinge assembly comprising:
        a first frame member connected to the first housing portion and having two spaced-apart portions with a first pair of opposing cam slots defining a first cam path;
        a second frame member connected to the second housing portion and having two spaced-apart portions with a second pair of opposing cam slots defining a second cam path;
        a first cam pin in the first pair of opposing cam slots, the first cam pin being configured to move along the first cam path;
        a second cam pin in the second pair of opposing cam slots, the second cam pin being configured to move along the second cam path;
        a third pin extending between the two spaced-apart portions of the first frame member;
        a fourth pin extending between the two spaced-apart portions of the second frame member; and at least first and second links, the first link having a first end rotatably connected to the first cam pin and an opposite second end rotatably connected to the fourth pin, and the second link having a first end rotatably connected to the second cam pin and an opposite second end rotatably connected to the third pin;

wherein the first and second frame members are configured to move between a closed position and an open position as the first and second cam pins move in the respective first and second cam paths when the first and second frame members are rotated between the closed position and the open position wherein the mobile terminal further comprises a stopper that defines a partially opened position of the first and second frame members between the closed position and the open position.

10. The mobile terminal of claim 9, wherein the first and second frame members define a gap therebetween when the first and second frame members are in the closed position.

11. The mobile terminal of claim 10, wherein the gap between the first and second frame members is configured to receive a display.

12. The mobile terminal of claim 9, wherein the first and second pairs of opposing cam slots are curvilinear.

13. The mobile terminal of claim 9, wherein the stopper is configured to abut one of the first and second links to prevent movement from the partially opened position to the open position.

14. The mobile terminal of claim 9, wherein the stopper is moveable between an active position, in which the stopper is configured to abut one of the first and second links to prevent movement of the first and second frame members from the partially opened position to the open position, and an inactive position, in which the stopper is configured to allow movement of the first and second links between the closed position, the partially opened position and the open position.

15. A mobile terminal comprising:
first and second housing portions;
a hinge assembly rotatably connecting the first and second housing portions, the hinge assembly comprising:
a first frame member connected to the first housing portion and having two spaced-apart portions with a first pair of opposing cam slots defining a first cam path;
a second frame member connected to the second housing portion and having two spaced-apart portions with a second pair of opposing cam slots defining a second cam path;
a first cam pin in the first pair of opposing cam slots, the first cam pin being configured to move along the first cam path;
a second cam pin in the second pair of opposing cam slots, the second cam pin being configured to move along the second cam path;
a third pin extending between the two spaced-apart portions of the first frame member;
a fourth pin extending between the two spaced-apart portions of the second frame member; and
at least first and second links, the first link having a first end rotatably connected to the first cam pin and an opposite second end rotatably connected to the fourth pin, and the second link having a first end rotatably connected to the second cam pin and an opposite second end rotatably connected to the third pin;

wherein the first and second frame members are configured to move between a closed position and an open position as the first and second cam pins move in the respective first and second cam paths when the first and second frame members are rotated between the closed position and the open position wherein the first and second frame members define a gap therebetween when the first and second frame members are in the closed position, the gap between the first and second frame members is configured to receive a display and the first and second frame members are configured to extend in generally opposing directions when in the open position to define a substantially flat surface extending between the first and second frame members.

16. The mobile terminal of claim 15, wherein the first and second frame members include a sliding track configured so that the display is slidable across the substantially flat surface extending between the first and second frame members.

17. The mobile terminal of claim 16, wherein the mobile terminal includes control keys that are accessible on opposing ends of the first and second housing portions when the first and second frame members are in the open position.

* * * * *

UNITED STATES PATENT AND TRADEMARK OFFICE
CERTIFICATE OF CORRECTION

Page 1 of 1

PATENT NO.        : 8,064,970 B2
APPLICATION NO.   : 12/210426
DATED             : November 22, 2011
INVENTOR(S)       : Gaddy et al.

It is certified that error appears in the above-identified patent and that said Letters Patent is hereby corrected as shown below:

In the Claims:
Column 7, Claim 3, Line 55: Please correct "the opening gap"
to read -- the gap --

Signed and Sealed this
Fourteenth Day of February, 2012

David J. Kappos
*Director of the United States Patent and Trademark Office*